Sept. 30, 1969     B. V. MARTIN     3,469,313
PORTABLE SAW

Filed Oct. 12, 1966     3 Sheets-Sheet 1

Inventor
BILL V. MARTIN

By Anderson, Luedeka, Fitch, Even, & Tabin     Attys.

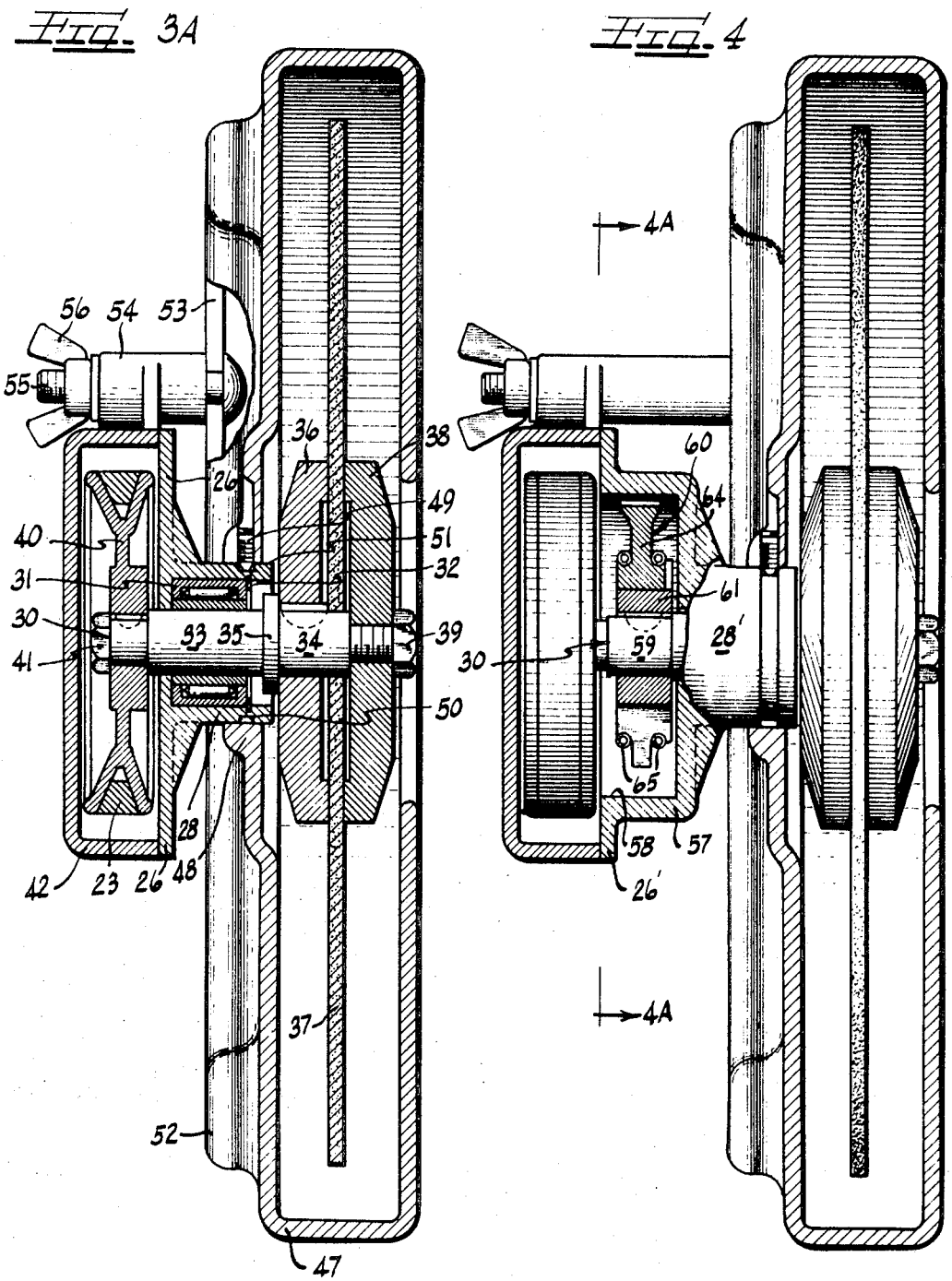

Sept. 30, 1969  B. V. MARTIN  3,469,313
PORTABLE SAW
Filed Oct. 12, 1966  3 Sheets-Sheet 3
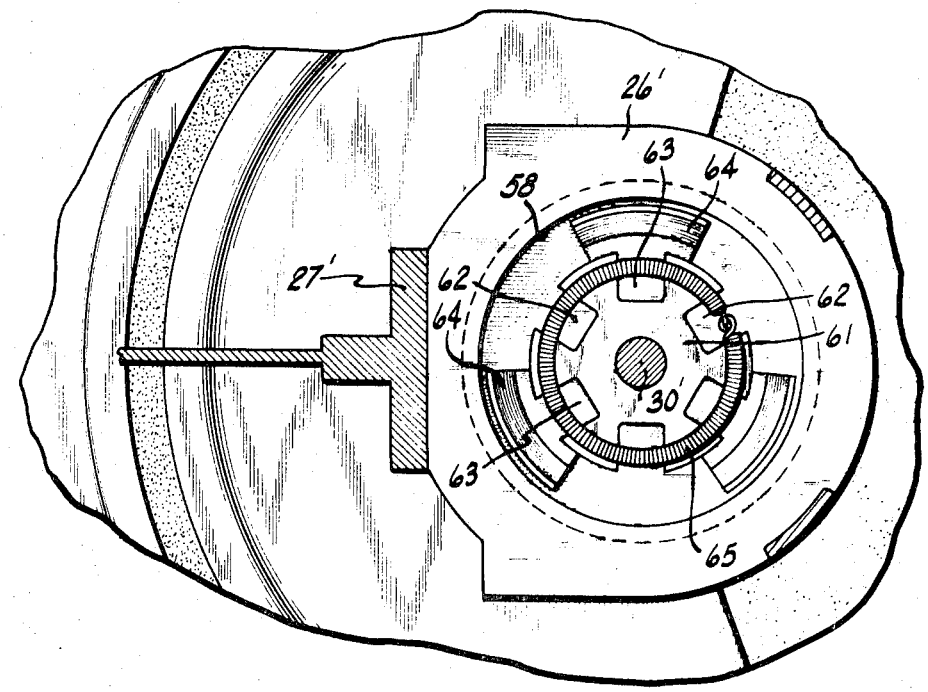
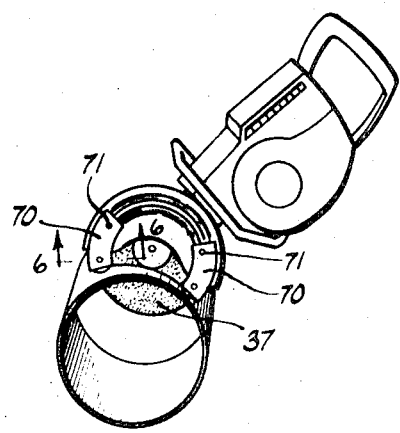
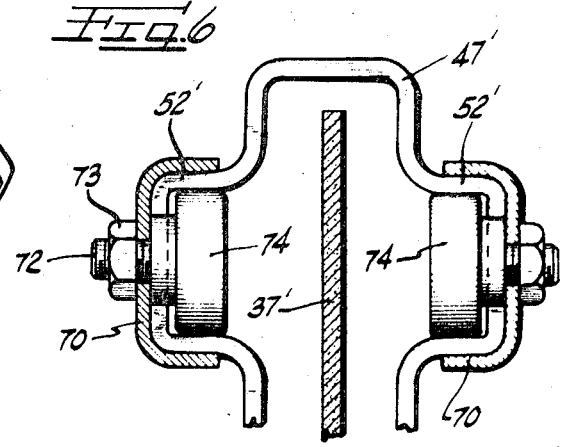
Inventor
BILL V. MARTIN
By Anderson, Luedeka, Fitch, Even, & Tabin  Attys.

United States Patent Office 3,469,313
Patented Sept. 30, 1969

3,469,313
PORTABLE SAW
Bill V. Martin, P.O. Box 506, Bloomington, Ill. 61702
Filed Oct. 12, 1966, Ser. No. 586,268
Int. Cl. B23d 45/16; B26b 29/00
U.S. Cl. 30—167
7 Claims

ABSTRACT OF THE DISCLOSURE

This invention contemplates the utilization of a power unit for a portable chain saw as the power unit for a portable circular saw capable of cutting wood, metal, or masonry. The drive sprocket of the chain-saw power unit is convertible in the field to a drive pulley which, in turn, is used to power a circular saw for cutting metal, masonry, and any less resistant material.

---

This invention relates to portable saws, and particularly to a conversion unit by means of which a portable, gasoline-engine-driven chain saw may be fitted out for other applications, for example, as a circular saw for cutting metal or masonry or the like.

One of the difficulties which has impeded the conversion of the power unit of chain saws to other portable power applications has been the difficulty of making a transition in field from the special driving sprocket of the endless saw-chain of the chain saw to a more universally useful power take-off.

The device of this invention provides that flexibility by eliminating the need for dismantling or replacing the special chain-driving sprocket of the chain saw, and by providing a novel pulley-adaptor which is simply slipped onto the saw chain sprocket coaxially thereof, and maintained in assembled driving relation therewith by the same fastener which normally maintains the driving relation of the sprocket with the saw chain itself.

With the flexibility thus obtained and the novel conversion unit herein disclosed, the chain-saw power unit becomes an effective portable circular saw adapted to a variety of metal-cutting operations such as are involved in salvage and rescue work, to general field work, and to the cutting of stone, concrete, and other masonry.

The rotary saw conversion unit comprises a demountable arm which is affixed to the portable power unit of a chain saw in substitution for the chain and chain bar, and which carries at its outer end a bearing with rotary spindle for a driven pulley and saw blade, the arm being formed so as to provide simultaneously a protective housing for the aforementioned pulley-adaptor, for the drive belt, and for other driving parts. The rotary blade itself, which is basically an abrasive-embedded disc, is shielded by a suitable blade guard which exposes only a segmental operative zone of the blade but which may be adjusted rotatably, coaxially with the saw blade, to select, within limits, the angle of the operational segment to the longitudinal axis of the mounting arm to adapt the saw for head-on cutting, i.e., longitudinally of the mounting arm, or for a more transverse cutting attack at an angle to the longitudinal axis of the mounting arm.

In the accompanying drawings:

FIGURE 3a is a sectional view through the axis of the saw blade, showing the detail of the bearing structure and saw spindle, and of the rotational adjustability of the blade guard relative to the mounting arm;

FIGURE 4 is a view similar to FIGURE 3a, but of a modified version in which a speed-limiting centrifugal brake is employed;

FIGURE 4a is a sectional view taken on the line 4a of FIGURE 4 to aid in showing the construction of the centrifugal brake;

FIGURE 5 is a perspective view of the circular saw conversion unit of the invention, shown especially further adapted for the cutting of pipe by a special depth limiting gauge which is adjustable to limit the penetration of the pocket cut to the desired cutting angle for advancing the blade into the remainder of the work; and FIGURE 6 is a sectional view on the line 6—6 of FIGURE 5 to show the contact rollers of the depth gauge, by means of which the positioning of the saw is stabilized for a perpendicular cut and flexing side-pressure on the blade minimized.

Figure 1:
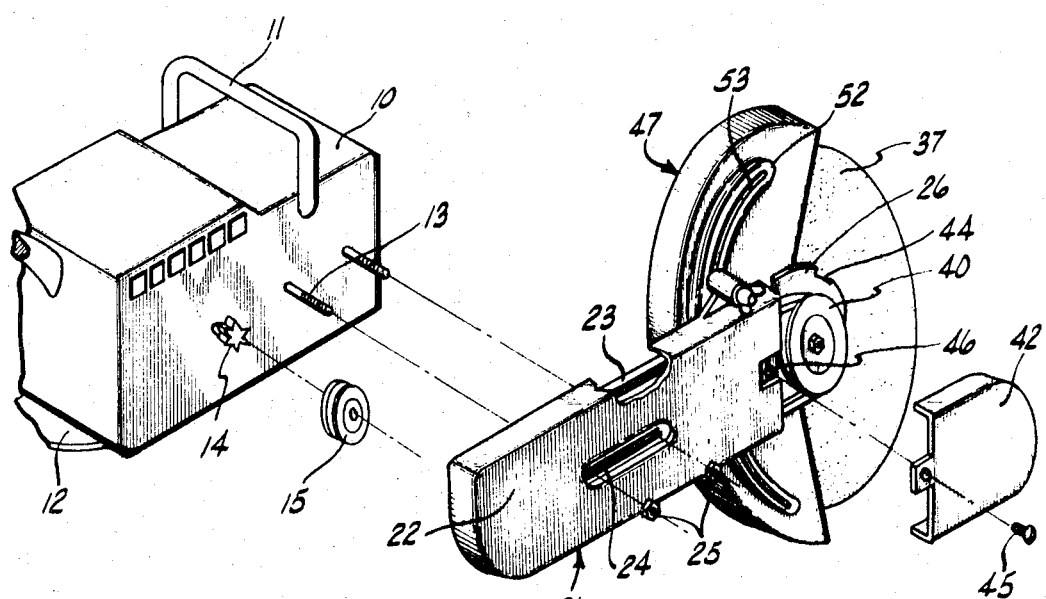
FIGURE 1 is an exploded perspective view intended to illustrate the manner of assembling the arm and pulley adaptor with the gasoline-engine power-unit of a chain saw after removal of the chain-bar and chain of the saw.

Referring to FIGURE 1, the gasoline-engine power unit of a chain-saw is shown in somewhat simplified form at 10. It is equipped with the usual carrying and guiding handles 11 and 12, a pair of sidewardly projecting mounting studs 13 by means of which the chain-bar is normally secured to the engine unit 10, and a drive sprocket 14 of form suitable for driving engagement with the individual link elements of a saw chain. The chain-bar and chain proper, being unnecessary to an explanation of the present invention, are not shown.

Figure 2:
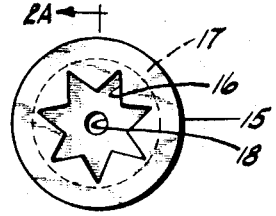
FIGURE 2 is an elevational view of that side of the pulley adaptor which is obscured in FIGURE 1.
Figure 2A:
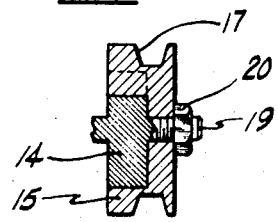
FIGURE 2a is a sectional view of the pulley adaptor assembled with the drive sprocket of the chain-saw power unit.

The final driving element of the power unit 10 is the chain sprocket 14 which is customarily driven through a centrifugal clutch (not shown) which permits the engine to idle without load. To facilitate the ready adaptation of the gasoline engine power unit, not only to the specific rotary saw application herein shown in detail, but also to other power applications, I have provided for the quick conversion of the chain-driving sprocket to a belt-pulley. This is accomplished by means of a slip-on pulley adaptor 15 which, as noted in FIGURE 2, is cored from one face thereof to provide a star-shaped socket 16, coaxial with the belt-groove 17 of the pulley-adaptor, to receive the saw-chain driving-sprocket in a slip fit to a depth which permits the pulley-adaptor to stand clear of the engine frame 10. Extending through the opposite face or wall of the pulley-adaptor is a central hole 18 which receives the threaded stud 19 which usually protrudes from the drive sprocket of the chain saw power-unit, and which normally serves to mount some form of retainer to keep the saw chain from "walking" off the sprocket. A nut 20 threaded onto the aforementioned stud 19 maintains the assembly of the pulley-adaptor with the chain-saw driving-sprocket, as shown in FIGURE 2a.

The mounting arm 21 for the circular-conversion unit comprises an attaching portion 22 in the form of a casting of rather thin-walled section having a central web and an inwardly directed peripheral flange which serves not only to strengthen the casting as an arm, but also provides a shielding skirt or guard for a V-belt 23. Approximately mid-way of the length of the arm 21 there is provided in the web a slot 24 with flange-reinforced edges, the slot being positioned to receive the mounting studs 13 of the engine unit to assemble the mounting arm 21 to the engine block 10, that assembly being maintained by a pair of nuts 25 turned up on the threaded studs, as indicated in FIGURE 1.

It will be apparent that the slot 24 is preferred to individual holes in order to provide for the tensioning of the belt after it is passed around the pulley-adaptor 15 when the saw-mounting arm is assembled with the engine block 10.

The forward or free end of the mounting arm 21 comprises a planar wall section 26 which is offset sidewardly from the web of the main or attaching portion 22 of the mounting arm, and is connected to the web of the attaching portion of the arm by offset or angle portion 27 of substantially greater thickness. Positioned centrally in the forward end of the arm is a bearing boss 28 which is reinforced by web connections to the wall section 26, one of those webs, 29, being positioned approximately longitudinally of the mounting arm, extending from the bearing boss, 28, through the offset angle portion 27 to the flange which surrounds the mounting slot 24, thus giving additional reinforcing depth to the mounting arm 21 without interfering with the path of travel of the belt 23 or other moving parts of the unit when assembled with the engine block 10.

The bearing boss 28, and the mounting of the bearing and the saw spindle therein, are better seen in the sectional view of FIGURE 3a.

The saw spindle 30 is mounted in a roller bearing 31 by a press fit in the inner race of the bearing, the outer race being seated by a slight press fit in the bearing boss 28. To insure against unintentional dislodgement of the bearing from the boss, a snap-ring fastener 32 is seated in a groove in the inner bore of the boss 28 to prevent such unintentional separation as might occur otherwise due to change of tolerances as a result of heating. As may be appreciated from FIGURES 1 and 3, the mounting arm may be cast as an integral piece and having in mind that the tool as a whole is portable and hand-held in the main, the metal used is aluminum. The bearings and saw spindle, however, are steel.

The saw spindle 30 itself is turned to provide the journal portion 33 which is pressed into the inner race of the bearing 31, and a mounting portion 34 of equal diameter, separated from the journal portion by a shoulder 35, and having keyed thereon a drive hub 36. The saw blade 37 is placed over the mounting portion 34 of the spindle in face contact with the drive hub 36, and a mating locking hub 38, secured by a cap screw 39 seated in a threaded bore in the end of the spindle 30, locks the two hubs and saw blade together for rotation with the spindle.

Figure 3:
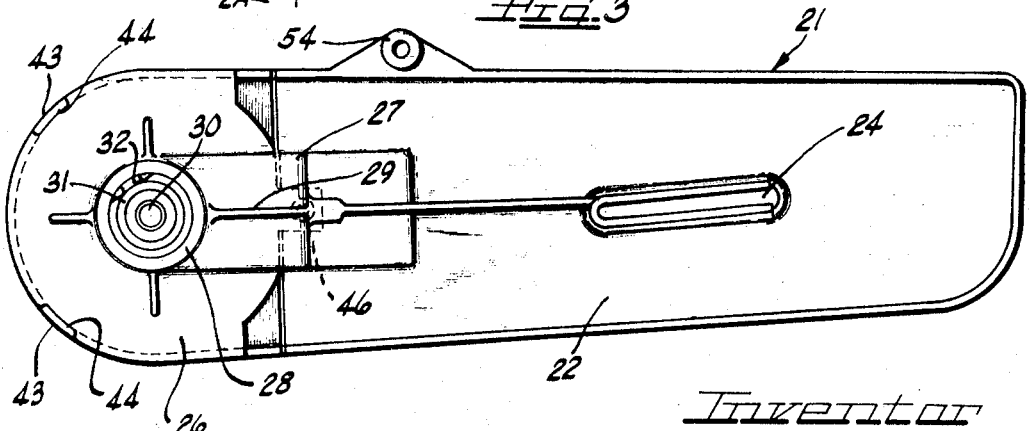
FIGURE 3 is an elevational view of the back side of the mounting arm of FIGURE 1, with the blade guard removed to better show the detail of the arm.

At the opposite end of the spindle, i.e. the left end as seen in FIGURE 3, the journal portion 33 of the spindle is stepped down to receive the driven pulley 40, which may be a die-casting provided with a formed V-groove to receive the V-belt 23 by which power is transmitted from the engine. The driven pulley 40 is preferably also keyed to the spindle, and maintained in assembled relation therewith by a cap screw 41 seated in a similar threaded bore in the left hand end of the spindle.

As will be apparent from FIGURES 1 and 3, the sideward offset of the front end of the mounting arm, i.e. of the planar section 26 which supports the bearing boss 28, is to facilitate the mounting of the driven pulley 40 on the saw spindle. A separate cap or guard 42, conforming generally in section to the rear or mounting portion 22 of the arm, is provided to cover the driven pulley 40 and as much of the drive belt 23 as would otherwise be exposed. The cap 42 is positioned and maintained in assembled relation with the arm 21 by means of locator tabs 43 received in notches 44 in the periphery of the planar wall section 26, and by a screw 45 received in a tapped hole 46 in the angular offset 27 which connects the two portions of the mounting arm.

Still referring to FIGURES 1 and 3a, it will be seen that the blade guard 47 is basically a crescent-shaped housing, which is similarly of cast aluminum, provided with a thickened section in one of its webs to form a hub 48 for assembly with the bearing boss 28, and in its opposite web, axially thereof, with a cut-out 49 to provide access to the locking hub 38 and bolt 39 to permit the changing of blades without removal of the guard.

The guard is journalled on the outer surface of the bearing boss 28 and is positioned axially thereon by a set screw 49 which, when seated in a circumferential groove 50 cut in the outer portion of the boss, prevents unintended separation. As a quick removal feature, however, an axial groove 51 extending from the circumferential groove 50 to the end of the bearing boss permits the blade guard to be slipped off of the bearing boss without adjustment of the set screw.

The desired rotational adjustment of the blade guard 47, i.e. to provide for exposure of the operating segment of the blade from a head-on cutting attitude to one which is either essentially upward or downward from the mounting arm 21, the web of the blade guard adjacent to the mounting arm 21 is provided with a raised arcuate boss 52 having formed therein an arcuate slot 53 centered on the mounting axis of the guard. The mounting arm 21 itself, on its upper flange, is provided with an integral boss 54 which is drilled to receive a carriage bolt 55 passed from the interior of the blade guard 47, through the arcuate slot 53 and through the boss 54 on the mounting arm. A wing nut 56 on the bolt may be drawn up to position the guard tightly against the end of the boss 54 to maintain any desired position of adjustment.

In the modified version shown in FIGURES 4 and 4a, the outer end 26′ of the mounting arm is modified to provide, in addition to the bearing boss 28′, a brake drum 57 the interior surface of which is machined to provide a smooth annular wall 58. The saw spindle 30′ is appropriately lengthened and provided with a stepped surface 59 intermediate the journal portion in the roller bearing and the outer portion upon which the drive pulley is mounted. On the intermediate stepped surface 59, and within the drum 57, there is mounted a centrifugal brake 60.

Referring as well to FIGURE 4a, it may be seen that the brake 60 comprises a central hub or rotor portion 61 provided with a series, in the illustrated instance six, of radially extending notches 62, in three of which are seated the stems 63 of brake shoes 64. The shoes 64, three in number in illustrated case, are disposed at 120° intervals about the hub 61 and are maintained in assembled relation therewith by a pair of spiral tension springs 65 seated in annular grooves machined both in the hub 61 and in the stems 63 of the brake shoes, wherein the springs, having their ends connected together in an endless hoop, restrain the brake shoes 64 against radially outward movement by their engagement with the shoulders formed in the shoe stems 63 by the aforementioned annular grooves. It will be apparent, therefore, that when the rotational velocity becomes sufficient to overcome the restraint of the two springs, the brake shoes 64 will move radially outwardly until their arcuate outer surfaces engage the annular wall 58 of the stationary brake drum.

Each brake shoe is preferably provided with a suitable replaceable wear surface, and the restraining springs are selected to limit the maximum speed of the saw blade according to the limitations, if any, imposed by the particular use. In a given case, the limiting factor might be the tensile strength of the blade material, or even the particular application, where, for example, in a hand-held cutting operation, the flexing of the rotating blade might be difficult to control.

In the further modification illustrated in FIGURES 5 and 6, which I have found particularly useful for the cutting of pipe, but which may be usefully applied to any other hand-held operation where accuracy of cut is important, I provide stabilizing contact between the blade guard and the work.

As shown in FIGURE 6, I provide arcuate bosses 52′ and slots 53′ in both webs of the blade guard, instead of in only one web as in the embodiment of FIGURES 3a and 4, and on the outside of each such boss 52′ I provide a conforming arcuate arm 70 which may be set in any desired position of adjustment on the blade guard by means of suitable bolt and nut fasteners 71 at one end of the arm which may be called the mounting end. At the opposite end of the arm, there is mounted, on a threaded spindle 72 secured in the arm by means of a nut 73, a free-turning roller 74, a contacting portion of which extends outwardly from the end of the arm to engage the work piece, as shown in FIGURE 5. The positions of the arms 70 may be altered as required to gauge or limit the depth of penetration of the saw blade 37' into the work.

The depth gauge is useful in any kind of pocket-cutting, but is particularly useful in pipe or other thin-wall applications in which, as the initial penetrating or pocketing cut is made, the saw tends to dig itself in. Moreover, while it is quite useful, particularly in pipe-cutting, to employ two pairs of gauge rollers to aid in maintaining a perpendicular cut, it will be appreciated that the depth-limiting function may be achieved as well by a single pair of gauge rollers disposed on only one side of the blade, but on opposite sides of the rotational axis. It will further be apparent that while rolling contact between the depth gauge and the work piece is desirable, the rollers may be eliminated in favor of simple nose contact between the ends of the gauge arms and the work piece.

By this invention, I have greatly increased the adaptability of the chain-saw power unit to other important applications and have provided the first commercially satisfactory, portable hand-held metal-cutting saw.

The novel construction of the unit, particularly the quick-change aspect of the conversion of the drive sprocket of the saw with the pulley-adaptor here shown, enables the operator to quickly convert the saw unit in the field, and without the use of any special tools, from the well-known wood-cutting chain saw to the metal-cutting circular saw herein shown, and equips the power unit for a variety of other belt-driven applications.

What is claimed is:

1. In a conversion unit for chain saws, a pulley-adaptor for converting the saw chain-sprocket drive to a belt drive comprising a pulley having therein, on its rotational axis, an aperture conforming to and adapted to receive the saw-chain sprocket in a slip fit coaxially of the pulley in rotational driving engagement therewith, and fastening means to keep the pulley-adaptor on the sprocket.

2. The structure of claim 1, wherein the conforming aperture does not extend completely through the pulley-adaptor but ends in a wall, and the fastening means extends through said wall.

3. A portable circular saw comprising a power unit having thereon a drive pulley, an arm adapted to be mounted on the power unit, a bearing in the arm spaced from the axis of the drive pulley, a rotary spindle in the bearing having thereon a driven pulley and saw blade, a belt connecting the two pulleys, a blade guard on said arm covering the non-cutting segment of the blade's rotational path, and a centrifugal brake to create a drag to maintain a predetermined maximum rotational velocity of the blade.

4. The structure of claim 3 wherein the brake comprises an annular housing in the arm adjacent to and coaxial with the bearing, and a rotor on the spindle having radially movable shoes thereon and resilient restraining means which balance the centrifugal force on said shoes and are selected to permit running contact between said shoes and said housing only upon reaching a predetermined speed.

5. A portable circular saw comprising a power unit having thereon a drive pulley, an arm adapted to be mounted on the power unit, a bearing in the arm spaced from the axis of the drive pulley, a rotary spindle in the bearing having thereon a driven pulley and saw blade, a belt connecting the two pulleys, a blade guard on said arm covering the non-cutting segment of the blade's rotational path, said blade guard being mounted on said arm coaxially with said said bearing and rotatable thereon to expose a uniform circular cutting segment of the blade path, and interacting fastening means on said guard and said arm to maintain the selected rotational adjustment of the guard.

6. A portable circular saw comprising a power unit having thereon a drive pulley, an arm adapted to be mounted on the power unit, a bearing in the arm spaced from the axis of the drive pulley, a rotary spindle in the bearing having thereon a driven pulley and saw blade, a belt connecting the two pulleys, a blade guard on said arm covering the non-cutting segment of the blade's rotational path, said guard having a depth gauge thereon to limit the radial penetration of the rotary saw blade said depth gauge comprising arms adjustably extensible from said guard on opposite sides of the rotational axis of the blade parallel to the blade and into the cutting-zone thereof, the ends of said arms being engageable with the workpiece to limit the depth of cut, and interlocking means on said arms and said guard to maintain the selected adjustment of the arms.

7. The structure of claim 6 wherein the said arms are two in number on each side of the plane of the saw blade, and each arm at its end is provided with a work-engaging roller whose axis parallels that of the blade.

References Cited

UNITED STATES PATENTS

| | | | |
|---|---|---|---|
| 574,209 | 12/1896 | McFadden | 188—185 |
| 1,708,345 | 4/1929 | Wodack et al. | |
| 2,725,753 | 12/1955 | Haug. | |
| 2,810,409 | 10/1957 | Ibelle et al. | |
| 2,909,068 | 10/1959 | Haug | 74—16 |
| 3,073,073 | 1/1963 | Van Pelt. | |
| 3,225,614 | 12/1965 | Skinner et al. | 74—230.01 |
| 3,382,578 | 5/1968 | Dobbertin | 143—159 X |

FRANK T. YOST, Primary Examiner

U.S. Cl. X.R.

30—293; 51—241; 74—230.01; 143—32, 43, 159